United States Patent Office 3,016,220
Patented Jan. 9, 1962

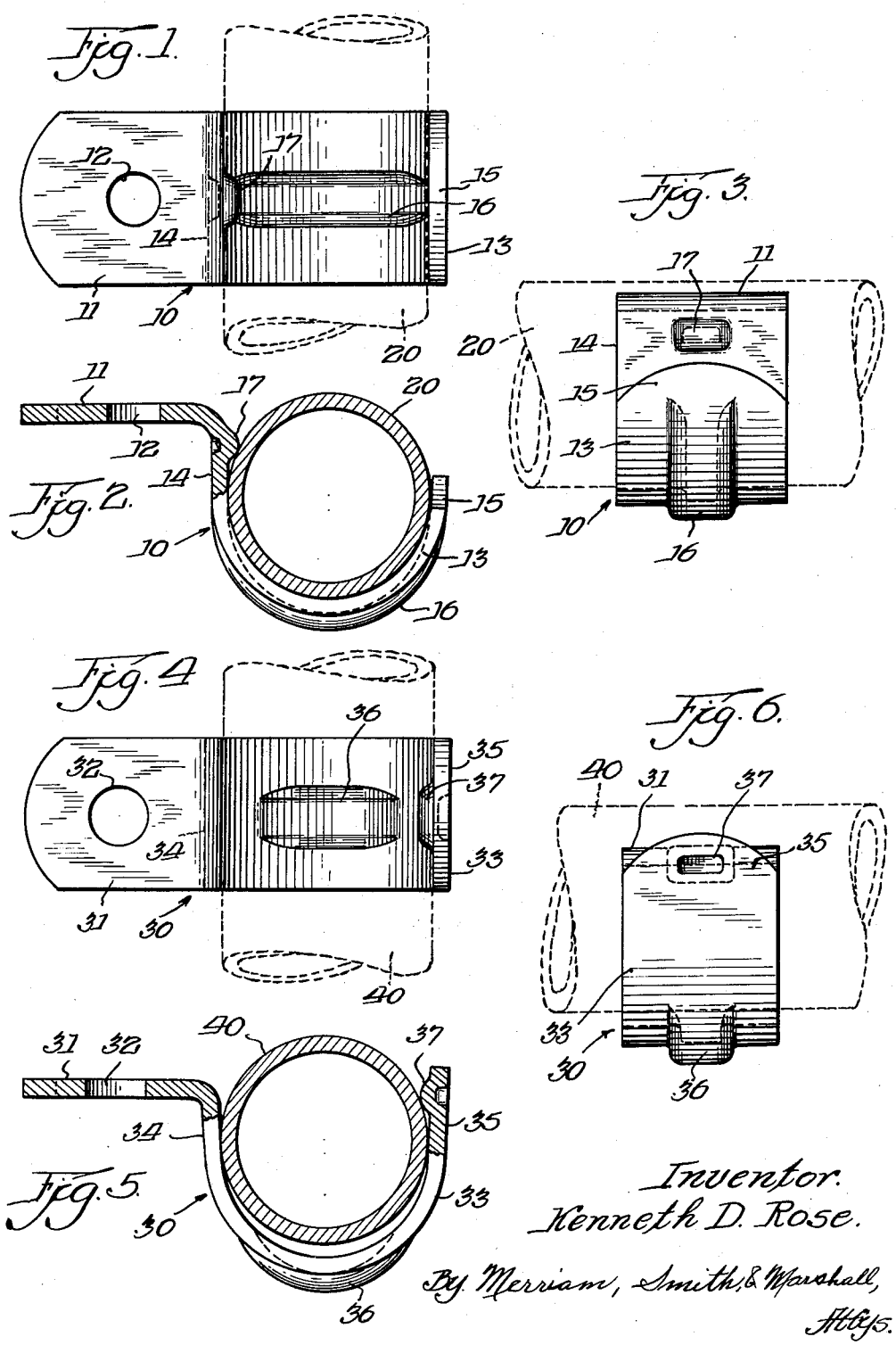

3,016,220
SNAP-ON METAL CLAMP FOR RIGID METAL PIPE
Kenneth D. Rose, Dubuque, Iowa, assignor to Blackhawk Industries, a corporation of Iowa
Filed Nov. 4, 1959, Ser. No. 850,803
4 Claims. (Cl. 248—74)

This invention relates to a snap-on, integral metal clamp for resiliently clasping a rigid metal pipe therein, and the combination of said clamp and clasped rigid metal pipe.

Clamps heretofore have either been unable to resiliently clasp pipes or, in cases wherein some clasping was obtained, to do so without marring or damaging the pipe when the clamp was frictionally secured to the pipe. These deficiencies are obviated by my snap-on, integral, resilient, metal pipe clamp.

Clamps commonly used in the past for securing rigid metal pipes to supporting structure, such as walls, merely cradled the pipe without clamping it. In such instances, the workman installing metal pipe was required to simultaneously hold the pipe, the clamp, and the fastening element (e.g., screw) that was used to secure the clamp to the supporting wall structure, and still be able to secure the clamp to the wall structure. This operation is inconvenient as well as time consuming.

The present invention comprises a snap-on, integral, metal pipe clamp or strap that may be resiliently snapped-onto rigid metal pipe so that it is independently and firmly frictionally secured thereto during its installation. Thus, my clamp may be applied to the pipe on the floor or ground and the unit raised or lifted to the wall, ceiling or other place of installation without the clamp dropping off by the force of gravity or changing its position on the pipe, thereby facilitating the installation of the pipe as well as supporting it after installation. In addition, my clamp may be frictionally secured to pipe having a protective finish or metal coating such as zinc without marring the finish or coating. This is important because the scratching of the protective coating provides a surface susceptible to corrosion and damage.

The pipe clamps and clasped pipes shown in the accompanying drawings have been drawn to scale.

In these drawings:

FIGURE 1 is a frictional top plan view of one embodiment of my pipe clamp prior to its securement to a rigid metal pipe, and shows in broken lines the position of the pipe after the clamp is secured thereto;

FIGURE 2 is a side elevational view partially in cross section of FIGURE 1 showing the pipe clasped in the clamp;

FIGURE 3 is a front elevational view of FIGURE 1;

FIGURE 4 is a top plan view, similar to FIGURE 1, of a second embodiment of my pipe clamp prior to its frictional securement to a rigid metal pipe, and shows the clasped pipe in broken lines;

FIGURE 5 is a side elevational view partially in cross section of FIGURE 4 showing the pipe clasped in the clamp; and FIGURE 6 is a front elevational view of FIGURE 4.

Referring to the drawings, particularly the clamp shown in FIGURES 1-3, my integral snap-on pipe clamp or strap must be formed of 8 to 18 gauge resilient metal, preferably steel. The clamp 10 has a flat base portion 11 with an opening 12 for receiving a fastening element such as a bolt or screw. The fastening element serves to secure the clamp to supporting structure.

The flat portion 11 extends outwardly away from the terminal end portion 14 of the resilient U-shaped hook 13. The hook 13 is shaped to encircle more than one-half of the rigid metal pipe 20 for which it is intended to resiliently clasp. The curved bottom of the hook 13 has an offset rib 16 stamped therein that extends outwardly thereof so as to increase the strength of the clamp 10.

An integral stamped dimple 17 in shown projecting from the end portion 14 of the hook 13. The dimple 17 has an inwardly projecting smoothly formed face that frictionally engages the pipe 20 without marring it when the clamp 10 is resiliently secured on the pipe 20. The dimple 17 and end portion 15 of the hook 13 define a normally (prior to the securement of the clamp about the pipe) narrow, resiliently extendible entryway from the pipe 20.

This entryway is normally narrower than the outside diameter of the pipe 20. However, when the clamp is secured to the pipe, the entryway is resiliently extended from its normal position to provide an entryway for the pipe 20 that is at least as wide as the outside diameter of the pipe. Once the clamp 10 is clamped about the pipe 20, the hook (particularly the entryway) resiliently snaps back to substantially its normal shape and the dimple 17 resiliently grips the pipe cooperatively with the end portion 15 of the hook 13 (at least in part) above the center of the pipe 20. As shown in FIGURE 2, the hook 13 is shaped so that the dimple 17, end portion 15, and an end portion 14 of the hook adjacent the dimple cooperatively grip the clasped pipe to provide three point contact therewith. Thus, the hook 13 frictionally and resiliently holds the clamp 10 on the pipe 20 and at the same time maintains continuous compression thereon.

The integral pipe clamp or strap 30 shown in FIGURES 4-6 must be formed of 8 to 18 gauge resilient metal and snaps-on the rigid metal pipe 40 in substantially the same manner described above with respect to the pipe clamp 10 shown in FIGURES 1-3. The clamp 30 has a flat base portion 31 with an opening 32 for receiving a fastening element. The flat portion 31 extends outwardly away from the terminal end portion 34 of the resilient U-shaped hook 33. The hook 33 is shaped to encircle more than one-half of the rigid metal pipe 40 for which it is intended to resiliently clasp. The curved bottom of the hook 33 has an offset rib 36 stamped therein that extends outwardly thereof. An integral stamped dimple 37 is shown projecting from the end portion 35 of the hook 33. The dimple 37 has an inwardly projecting smoothly formed face that frictionally engages the pipe 40 without marring it when the clamp is resiliently secured on the pipe. The dimple 37 and end portion 34 of the hook 13 define a normally narrow, resiliently extendible entryway for the pipe 40. This entryway is normally narrower than the outside diameter of the pipe 40. However, when the clamp is secured to the pipe, the entryway is resiliently extended from its normal position to provide an entryway that is at least as wide as the outside diameter of the pipe 40. Once the clamp is clamped about the pipe 40, the hook (particularly the entryway) resiliently snaps back to substantially its normal shape and the dimple 37 resiliently grips the pipe cooperatively with the end portion 34 of the hook 33 (at least in part) above the center of the pipe 40. As shown in FIGURE 5, the hook 33 is shaped so that the dimple 37, end portion 34, and an end portion 35 of the hook adjacent the dimple and spaced therefrom cooperatively grip the clasped pipe to provide three point contact therewith, there being a discontinuity of contact between any two of the three points. The hook 33, thus, frictionally and resiliently holds the clamp 30 on the pipe 40 and at the same time maintains continuous compression thereon.

My snap-on pipe clamp may have the dimple located at either end portion of the hook. For example, the dimple may be located at the very end of the free end portion of the hook.

The clamp 10 has a dimple 17 at the end portion 14 of the hook 13 from which the base 11 extends, whereas the clamp 30 has a dimple 37 at the free end portion 35 of the hook 33. However, it is essential that the dimple be integral with the hook and have a smoothly formed face so as to obviate marring of the pipe when the clamp is snapped thereon. Thus, the integrally extending dimple must not be a tab or detent that is cut out of an end portion of the hook so that a marginal part of the tab or detent is free of the body portion of the hook.

It is essential that the entire clamp be integral and formed of resilient 8-18 gauge metal.

My pipe clamp should be formed by stamping it from sheet metal. This enables the clamp to be economically made and provides a clamp having great strength.

The foregoing detailed description has been given for clearness of understanding only, and no unnecessary limitations should be understood therefrom, as modifications will be obvious to those skilled in the art.

I claim:

1. A snap-on integral clamp formed of 8 to 18 gauge resilient metal having a U-shaped hook portion for resiliently clasping therein a rigid pipe formed of non-resilient metal and a flat base portion with an opening therein for positioning the clamp and clasped pipe to a support, said flat base extending outwardly away from a terminal end portion of said hook, said hook being adapted to encircle more than half the circumference of the pipe, said hook having an offset rib formed therein that extends along the curved bottom portion thereof so as to increase the strength of the clamp and being provided with an inwardly and integrally extending dimple at one terminal end portion thereof, said dimple having an inwardly projecting smoothly formed face for engaging the pipe without marring it when the pipe is introduced in the hook for securement therein, said dimple and other end portion of the hook defining a normally narrow resiliently extendible entryway for the pipe, said entryway normally being narrower than the outside diameter of the pipe that is to be secured in said hook and resiliently providing an extended entryway at least as wide as said diameter of the pipe when the pipe is introduced into the entryway for securement in the hook, said dimple being positioned to resiliently grip the clasped pipe cooperatively with the other end portion of said hook, at least in part, beyond the center of the clasped pipe so as to hold the clamp resiliently on the pipe and at the same time maintain continuous compression thereon, and said hook being shaped to have said other end portion, the dimple, and a portion of said one end portion between said other end portion and dimple and spaced from and adjacent to said dimple cooperatively grip the clasped pipe to provide three point contact therewith, there being a discontinuity of contact between any two of the three points.

2. The clamp of claim 1 wherein the dimple is wider than it is high so that it affords more extensive contact with the pipe in a direction along the length of the pipe than in a direction along the circumference of the pipe.

3. In combination, a non-resilient metal pipe and a snap-on integral clamp formed of 8 to 18 gauge resilient metal having a U-shaped hook portion resiliently clasping the pipe therein, said clamp having a flat base portion with an opening therein for positioning the clamp and clasped pipe to a support, said flat base extending outwardly away from a terminal end portion of said hook, said hook encircling more than half the circumference of the pipe and being provided with an inwardly and integrally extending dimple at one terminal end portion thereof, said hook having an offset rib formed therein that extends along the curved bottom portion thereof so as to increase the strength of the clamp, said dimple having an inwardly projecting smoothly formed face engaging the pipe that does not mar the pipe when it is introduced in the hook for securement therein, said dimple and other end portion of the hook defining an entryway for the pipe, said entryway being narrower than the outside diameter of the pipe that is secured in said hook and resiliently providing an extendible entryway at least as wide as said diameter of the pipe when the pipe is introduced into the entryway for securement in the hook, said dimple resiliently gripping the clasped pipe cooperatively with the other end portion of said hook, at least in part, beyond the center of the clasped pipe thereby holding the clamp resiliently on the pipe and at the same time maintaining continuous compression thereon, and said other end portion of the hook, the dimple, and a portion of said one end portion of the hook between said other end portion and dimple and spaced from and adjacent to said dimple cooperatively gripping the clasped pipe to provide three point contact therewith, there being a discontinuity of contact between any two of the three points.

4. The combination of claim 3 wherein the dimple of the clamp is wider than it is high so that it affords more extensive contact with the pipe in a direction along the length of the pipe than in a direction along the circumfeernce of the pipe.

References Cited in the file of this patent

UNITED STATES PATENTS

| 2,318,853 | Hall | May 11, 1943 |

FOREIGN PATENTS

| 642,789 | France | May 9, 1928 |
| 872,476 | France | Feb. 16, 1942 |